United States Patent

[11] 3,586,033

[72] Inventor Ellsworth E. Hieber
Glendale, Calif.
[21] Appl. No. 839,203
[22] Filed July 7, 1969
[45] Patented June 22, 1971
[73] Assignee Schulz Tool and Manufacturing Co.
San Gabriel, Calif.

[54] COMBINED AERIAL REFUELING COUPLING AND PRESSURE REGULATOR
1 Claim, 3 Drawing Figs.

[52] U.S. Cl. .................................................... 137/220,
137/505.26, 137/514.7
[51] Int. Cl. ...................................................... G05d 16/10
[50] Field of Search ........................................... 137/220,
221, 484.6, 484.8, 505.26, 514.7

[56] References Cited
UNITED STATES PATENTS

| | | | |
|---|---|---|---|
| 2,137,025 | 11/1938 | Niesemann .................. | 137/484.8 |
| 2,519,798 | 8/1950 | Temple ....................... | 137/484.6 |
| 2,946,605 | 7/1960 | Mosher ....................... | 137/614.03 |
| 3,192,940 | 7/1965 | Wiersholm .................. | 137/220 |
| 3,276,468 | 10/1966 | Lebow .......................... | 137/220 X |
| 3,489,165 | 1/1970 | Salerno ........................ | 137/220 |

FOREIGN PATENTS

| 1,093,639 | 11/1960 | Germany ...................... | 137/505.26 |
|---|---|---|---|

*Primary Examiner*—M. Cary Nelson
*Assistant Examiner*—Michael O. Sturm
*Attorney*—Whann and McManigal

ABSTRACT: A probe nozzle and drogue fuel line coupling for in-flight refueling of aircraft, and in which a balanced poppet valve automatically regulates the flow of the transferred fluid and prevents pressure surges in response to variations of the pressure of the transferred fluid from a predetermined value.

ELLSWORTH E. HIEBER
INVENTOR
WHANN & McMANIGAL
Attorneys for Applicant
BY
Robert H. McManigal ELLSWORTH E. HIEBER
INVENTOR
WHANN & McMANIGAL
Attorneys for Applicant
BY Robert M. McManigal

COMBINED AERIAL REFUELING COUPLING AND PRESSURE REGULATOR

BACKGROUND OF THE INVENTION

This invention forms a part of a system wherein a tubular connection is lowered from a tanker plane and with which connections are made with a forwardly extending conduit member on a plane to be refueled.

The conduit extending from a tanker plane carries at its end a fitting called a drogue, and with which fluidtight connections are made by a fitting, called a probe, at the end of the conduit member extending forwardly from a plane to be refueled. The coupling connection between the drogue and probe is made in midair and is a universal connection to accommodate relative movements of the plane in flight.

A prior art system of the above general type is shown in U.S. Letters Pat. No. 2,946,605, to Mosher, for "In-Flight Aircraft Refueling Apparatus."

In such prior art systems, it has been found that relatively high-pressure surges can be generated during an aerial refueling operation, and that such surges provide a potential source of damage to the receiver aircraft fuel system components. Also, the demand regulations of refueling pumps, the operation of intertankage cross feed float switches and shutoff valves, and the shutoff valves of the receiver aircraft are potential sources of surge shock waves which can travel in the refueling connection line between the tanker aircraft and the receiver aircraft.

Attempts have been made in an endeavor to reduce the potential effects of these pressure surges by using various schemes such as large volume accumulators and overboard venting, but such measures have not proved too successful due to certain inherent undesirable problems and operating characteristics.

These problems have in a great measure been solved in the present invention by providing a poppet valve in the fluid flow connection between the tanker and receiver aircraft, preferably at the drogue-probe coupling apparatus, this valve facing upstream and having its seating area balanced to upstream pressure and actuated by piston means which is subject to downstream pressure on one side, balanced against a spring force and ambient air pressure on the other side for a predetermined pressure value.

SUMMARY OF THE INVENTION

The present invention relates generally to aerial refueling coupling apparatus for in-flight refueling of aircraft, and is in particular concerned with improved means for regulating flow of the transferred fluid and prevention of high-pressure surges.

Having in mind the inherent disadvantages of the prior art apparatus, it is one object of the present invention to provide improved means for automatically regulating the flow of transferred fluid during in-flight refueling, and for preventing surge shock waves.

It is a further object of the invention to provide in an in-flight fueling system fluid transfer connection, an improved balanced poppet valve, and actuator means in which downstream fluid pressure is balanced against a spring pressure and ambient atmosphere, and which responds to variations of the transferred fluid from a predetermined value.

Another object of the invention is to provide in a valve for automatically regulating the flow of transferred fluid between aircraft during in-flight refueling, improved valve actuating means which operates with a rapid valve closing action, but a slowed down valve opening action, whereby hunting and chattering of the regulating valve is minimized.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Figure 1:
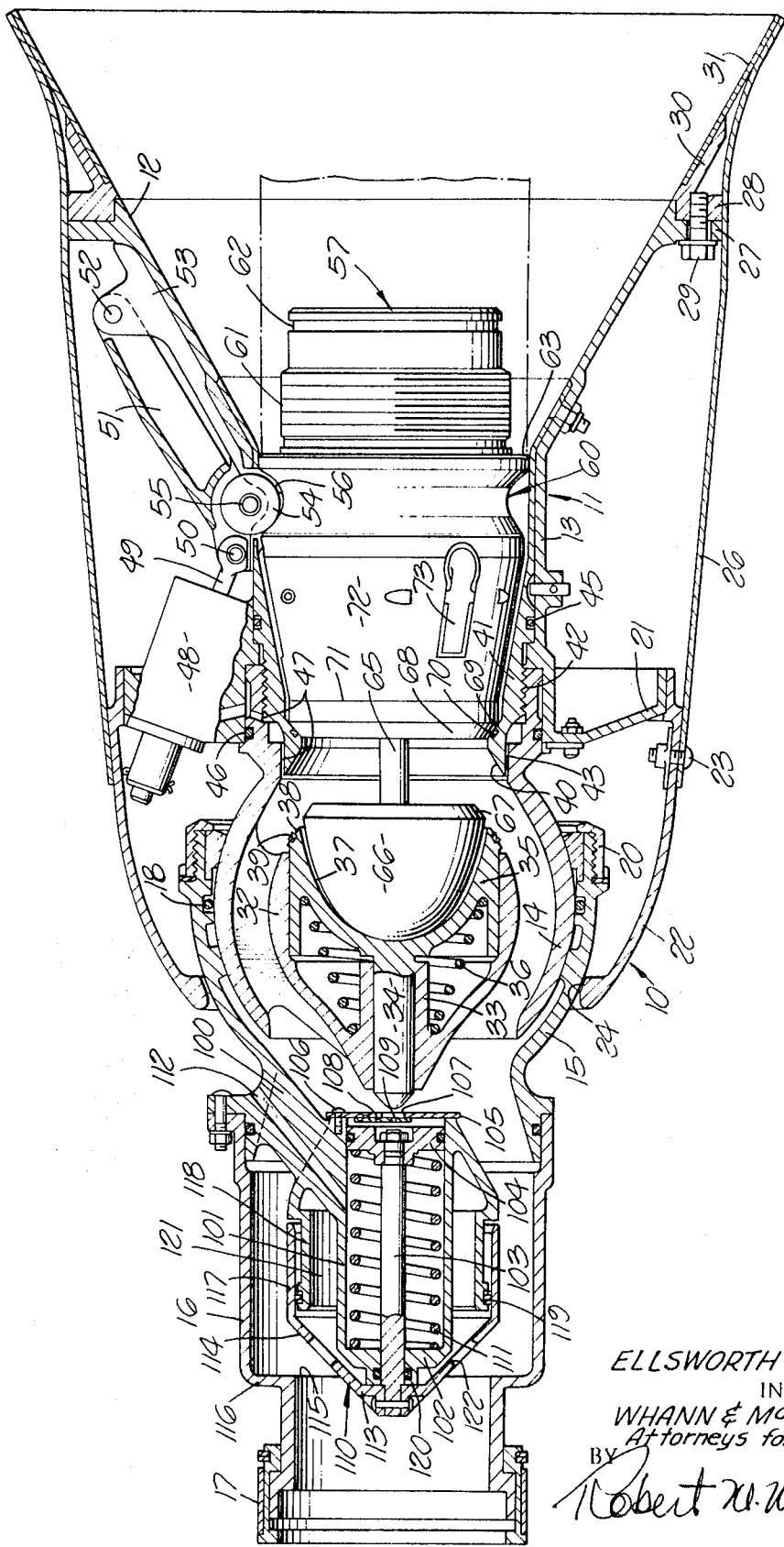
FIG. 1 is a partially cross-sectional view of in-flight coupling apparatus having a regulating valve according to the present invention, the valve being in an open position.

Referring more specifically to the drawings, there is shown in FIG. 1 coupling apparatus according to the present invention, wherein a drogue 10 includes a member generally designated at 11 having a conical or bell-shaped portion 12, an intermediate cylindrical portion 13, and a generally spherical portion 14 at its left end. The spherical portion 14 forms a ball of a ball and socket joint, the socket member being designated as 15 and being generally hemispherical in shape. The socket member is cylindrical at its open end where it is connected with a tubular extension 16 which carries a ring-shaped coupling 17 for connection with an articulated conduit assembly, extending downwardly from the tanker airplane which supplies the fuel for the receiver plane being fueled.

The inner end of the socket member is cylindrical and carries a seal 18 which engages the spherical portion 14. This seal is held in position by a locking ring 20 engaging the cylindrical portion of the socket member in a screw-threaded relationship. The connection between the socket member and the spherical portion provides for universal movement of the member 11 of the drogue relative to the socket and coupling member 17.

The intermediate portion 13 of the member 11 has outwardly extending webs 21 to which is attached a generally circular and partially frustoconical member 22 by bolts as shown at 23. The left end of the member 22 is tapered and has an inner spherical surface 24 spaced outwardly from and so as to move along the exterior of the socket member 15. A conical shell 26 is attached to the member 22 and extends around the cone or bell-shaped portion 12 of the drogue. The portion 12 has a radially extending flange 27 on which the shell 26 is supported. A ring-shaped member 28 is secured to the flange 27 by suitable bolts 29 and has a flared extension 30, against the inner surface of which is a cone-shaped member 31 having an inner surface flush with the interior of the bell-shaped portion 12.

Within the spherical portion 14 there is formed a generally hemispherical web 32 having a central longitudinal guide member 33 with which is received a stem 34 of a poppet valve 35. The poppet valve 35 operates against a coiled spring 36 surrounding the guide member 33. The poppet valve is of generally conical shape and has an inner concave dome-shaped face 37 and a sealing face 38 fitted with a sealing ring 39 adapted to seat on a seat 40 formed on the adjacent end of a generally cylindrical member 41 within the intermediate portion of the drogue. The cylindrical member 41 is threadedly engaged at 42 with the right-hand end of the spherical portion 14. The member 41 has a cylindrical face at its left end as shown at 43 and which engages an internal cylindrical face of the spherical portion 14. A seal 45 is provided between the intermediate portion 13 and the cylindrical member 41, and a seal 46 between the right-hand end of the spherical portion 14 and the intermediate portion 13.

In the end of the member 41, formed in part by grooves in the cylindrical face 43, three circumferentially spaced ports 47, open into the face 40 and connect the interior of the drogue with three circumferentially spaced hydraulic actuators 48, respectively. Extending outwardly of each actuator is a toggle link 49 which is moved reciprocally by the operation of the actuator. The toggle link is connected on a pivot 50, supported by a link 51 which in turn is supported on a pivot 52, secured in a bracket 53 radially outwardly of the bell-shaped portion 12. A roller 54 is supported on a pin 55 in the link 51. The links 49 and 51 form a knee which is adapted to be flexed into a circumferential groove or channel 56 of the probe, generally designated as 57.

The specific details of the construction of the probe 57 have not been shown as these are not material to the present invention. In general, however, the probe embodies a construction similar to that described in the aforementioned U.S. Pat. No. 2,946,605 and is shown as comprising a generally cylindrical housing member 60 having a threaded portion 61, an annular groove 62 and a shoulder 63, adapting it for connection to a tubular member extending from the receiver airplane to be refueled. The housing member 60 has a generally cylindrical passage therethrough and is internally provided with means, not shown, for supporting a valve stem 65.

The valve stem 65 carries at its forward, outer end a poppet valve 66 which has the shape of a convex dome so as to fit into the concave face of the valve 35. The poppet valve 66 has a conical face 67 which seats within the outer end of a reciprocally mounted sleeve, not shown, but which is normally biased into sealing contact with the valve so as to form a normally closed valve at the inserted end of the probe.

The above-mentioned outer end of the sleeve is provided with a conical face 68 which is adapted to contact a complementary surface 69 of the probe member 41. A sealing ring 70 is provided in a groove in the surface 69 to seal the probe in the drogue. Adjacent the end of the probe is an annular shoulder 71 which limits the movement of the probe into the housing by making contact with a forward end of an outwardly flared portion 72 of the housing member 60.

When by the forward motion of the plane to be refueled, the probe 57 is moved into the drogue 10 trailing rearwardly of the fueling plane, three spring biased latches 73 operate to release the sleeve so it may be retracted or forced into the housing member 60, when the face 68 on the probe makes contact with the face 69 on the drogue member 41, and at which time a seal is formed between the probe and the drogue by means of the sealing ring 70.

As the retraction of the sleeve occurs, the housing and poppet valve 66 continue to move inwardly and the latter moves into the concave portion of the poppet valve 35 to move its sealing surface 38 off its seat 40. At this time, the poppet valve 66 and the poppet 35 are then in their open positions. When the sealing ring 39 moves off of the seat 40, fuel pressure within the drogue is admitted to the three hydraulic actuators 48 through the respective ports 47 to assist springs, not show, in the actuators in urging the toggle links 49 outwardly of the actuators so as to flex the toggle joint and urge the rollers 54 into the channel 56. A latching force is thus applied to latch the probe and drogue together with a desired braking resistance, dependent upon the fuel pressure and conveniently variable by adjustment of the springs in the hydraulic actuators 48. The drogue and probe are thus assembled and coupled for the flow of fuel through the drogue, into the probe and into the plane being refueled.

When the fueling operation has been completed, the fuel pressure within the drogue is reduced or depleted. The probe is then free to come out of the drogue by overcoming the toggle spring action, allowing withdrawal of the probe by action in the plane having been fueled, or by withdrawal of the drogue by action in the fueling plane.

In the prior art, as thus far described, it has been found that during the time when the drogue and probe are thus coupled and fluid is being transferred from the tanker aircraft to the receiver aircraft damaging pressure surges and undesirable high pressures may be generated. It is therefore a primary feature of the present invention to provide means for regulating and controlling the fluid flow pressures as well as damaging surge shock waves by regulating means which will now be described.

Figure 2:
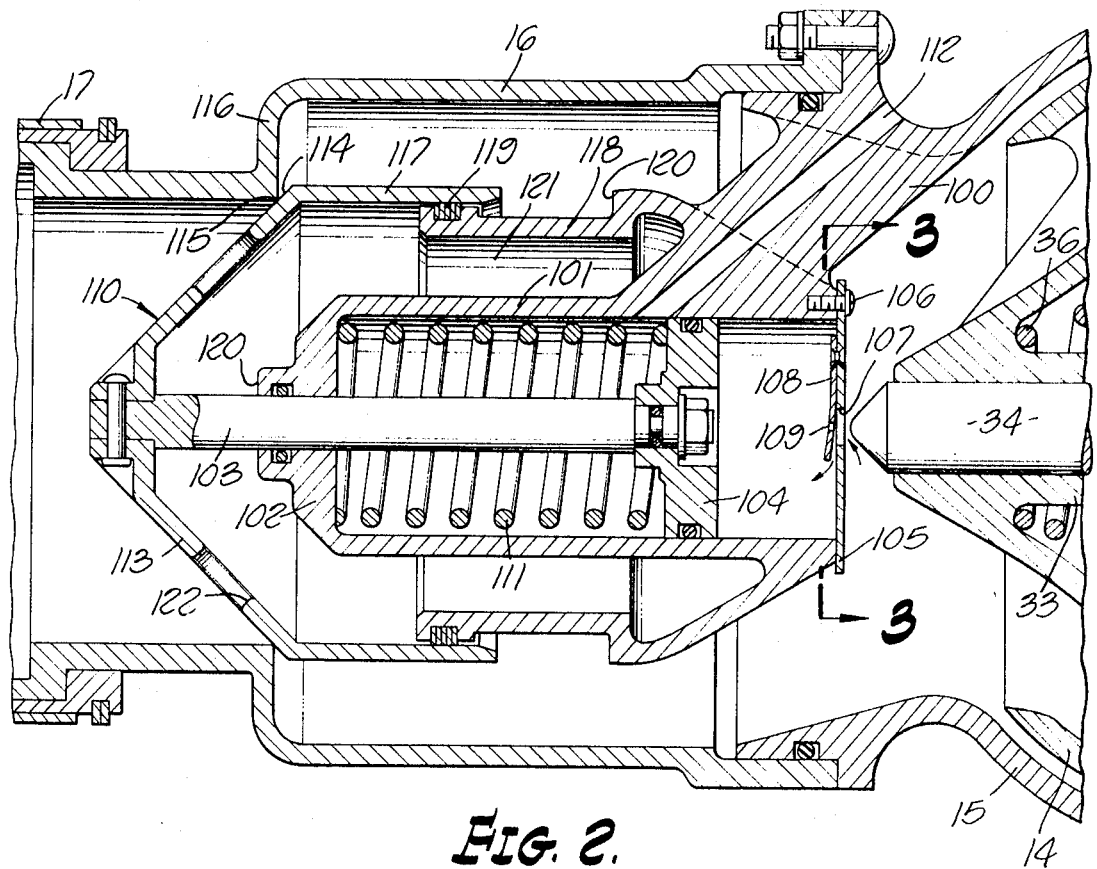
FIG. 2 is an enlarged fragmentary sectional view showing the regulating valve in a closed position.
Figure 3:
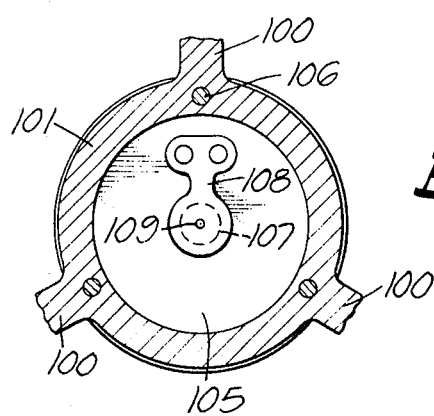
FIG. 3 is a fragmentary sectional view, taken substantially on line 3—3 of FIG. 2, showing details of the check valve for controlling the actuator means of the regulating valve.

Referring to FIGS. 1 and 2, web members 100 extend from the socket member 15 and provide a rigid support for a cylinder structure 101 in the tubular extension 16, this cylinder having a closed end 102 within which there is reciprocally mounted a piston rod 103. The piston rod end which is disposed within the cylinder 101 carries a piston head 104 which is operatively associated with the cylinder. The other end of the cylinder is closed by a plate 105 secured over the open end as by a plurality of holding screws 106. This plate has an inlet opening 107 which is normally closed by a flapper valve 108 having a restricted orifice 109 therein in registration with the opening 107. This flapper valve is utilized to control the inflow of pressurized fluid into this end of the cylinder at a comparatively fast rate, and restrict the outflow of the fluid to a slow rate so as to prevent hunting and chattering during operation of a poppet valve 110 carried by the opposite end of the piston rod 103. Interiorly of the cylinder the opposite side of the piston head is subject to a balancing force produced by a coiled spring 111 which surrounds the piston rod 103 and has one end bearing against the closed end 102 and its other end bearing against the piston head 104. This side of the piston head is also subjected to ambient air pressure through a bore passageway 112 which extends from the cylinder interior through one of the webs 100 to the exterior of the socket member 15.

The poppet valve 110 has a frustoconical wall 113 which points upstream and is adapted at its outer peripheral margin, as indicated at 114, to seat in closed position of the valve upon the inner edge 115 of an inwardly projecting radial shoulder 116 of the tubular extension 16. The wall 113 at its outer periphery connects with a cylindrical wall portion 117 which extends downstream and is in telescoping relation with an inner cylindrical wall 118 supported upon the webs 100 and extending upstream therefrom. The walls 117 and 118 are circumferentially sealed by a sealing ring 119, and movement of the poppet valve in an opening direction is limited by engagement of the upstream end of the wall 113 with an abutment shoulder 120 formed on the closed end 102 of the cylinder. The walls 117 and 118 are outwardly spaced from the cylinder 101 and cooperate to form an annular compartment or cavity 121 surrounding the cylinder. This cavity is vented through a plurality of openings 122 into the flow path of the fluid being transferred from the tanker aircraft to the receiver aircraft through the tubular extension 16. The movement of the poppet valve 110 is thus balanced with respect to the pressure of the fluid being transferred.

From a consideration of the foregoing description it will be apparent that the force which is exerted by the coiled spring 111 will determine the value of the fluid pressure at which the poppet valve will operate as well as the regulatory characteristics of the valve. In operation, it will therefore be apparent that as the fluid pressure of the transferred fluid is increased above the predetermined balance point of the poppet valve due to higher pumping pressure or downstream pressure increases due to the operation of system elements at the receiver aircraft, the effect will be to overcome the spring force and cause the piston and attached poppet to move in a direction to throttle the flow of the fluid being transferred so as to effect a decrease of the pressure to the predetermined pressure level.

In this respect, the flapper valve 108 permits a rapid throttling action for the decreasing of surge pressures and the like, but slows down an opening operation of the valve which will be effective in preventing hunting and chattering of the poppet valve operation.

The invention and its attendant advantages will be understood from the foregoing description and it will be apparent that various changes may be made in the form, construction and arrangement of the parts of the invention without departing from the spirit and scope thereof or sacrificing its material advantages, the arrangement heretofore described being merely by way of example.

I claim:

1. The combination with a refueling connection for the transfer of fluid between aircraft in flight and which includes a drogue having a socket member supported for universal movement, of a fluid flow regulator, comprising:

a. a tubular housing comprising an extension secured to said socket member for universal movement therewith and having a flow channel therein for fluid being transferred by said refueling connection;
b. a fluid flow regulating valve member supported in said housing for axial closing and opening movements in relation to an associated valve seat carried by said housing;
c. valve actuating means for controlling the position of said valve in response to changes in the pressure of the transferred fluid within said housing, and being operative at a predetermined value of the pressure of said fluid to maintain the valve in a balanced position against movement, at a fluid pressure below said predetermined value to actuate the valve in an opening movement, and at a fluid pressure above said predetermined value to actuate the valve in a closing movement, said actuating means comprising a piston operatively associated with a cylinder and having a piston rod connected with said valve, said piston having one side subject to the transferred fluid pressure, balanced against a spring pressure and ambient pressure on the opposite side of said piston; and
d. an inlet for said fluid into said cylinder on said one side of said piston; and
e. a valve including means providing a fast inflow of said fluid through said inlet into said cylinder, and restricted outflow of said fluid through said inlet from said cylinder.